May 18, 1937.  C. HOTCHKISS  2,080,718

HEAT CONTROL SYSTEM AND SWITCHING MECHANISM THEREFOR

Filed May 13, 1933  3 Sheets-Sheet 1

Inventor
CLIFFORD HOTCHKISS
By George H. Fisher
Attorney

Inventor
CLIFFORD HOTCHKISS

By George H. Fisher
Attorney

May 18, 1937.  C. HOTCHKISS  2,080,718
HEAT CONTROL SYSTEM AND SWITCHING MECHANISM THEREFOR
Filed May 13, 1933  3 Sheets-Sheet 3

Inventor
CLIFFORD HOTCHKISS

By George H. Fisher
Attorney

Patented May 18, 1937

2,080,718

UNITED STATES PATENT OFFICE 2,080,718

HEAT CONTROL SYSTEM AND SWITCHING MECHANISM THEREFOR

Clifford Hotchkiss, Milwaukee, Wis., assignor to Minneapolis-Honeywell Regulator Company, Minneapolis, Minn., a corporation of Delaware Application May 13, 1933, Serial No. 670,861

17 Claims. (Cl. 200—138)

The present invention relates to improvements in heat control systems and particularly those systems adapted to control a burner. The system of the present invention is especially useful for controlling the feeding of solid fuel to a furnace or boiler but it also has utility for controlling the feeding of liquid or gaseous fuels and, in fact, for the control of combustion in any manner whatsoever. The switching mechanism of the present invention is particularly adapted for use in the various aforementioned control systems but this switching mechanism also has general utility in the field of automatic controls.

One of the objects of the present invention is the provision of a switching mechanism comprising a plurality of switches operated by a single actuator, together with means whereby all of the switches may be adjusted in unison and additional adjusting means whereby one of the switches may be additionally adjusted in respect to the other of the switches.

A further object of the invention is the improvement upon those switching mechanisms sometimes referred to as three-position switches wherein a switch assumes a first circuit controlling position, is moved to a second circuit controlling position and then returns to its first circuit controlling position upon movement of an actuator in a single direction. It is an object of the present invention to provide means for manually latching such a three-position switch in its second circuit controlling position when the actuator is in such position that the switch would normally assume its first circuit controlling position, together with means whereby the switch will be released for automatic control upon movement of the actuator to such a position that the switch would normally be moved to its second circuit controlling position.

A further object of the invention is the provision of a three-position switching mechanism, together with a second switching mechanism which is moved from one of its circuit controlling positions to its other circuit controlling position while the three-position switching mechanism is maintained in its second circuit controlling position. More specifically, the second switching mechanism is provided with means whereby it may be operated with or without an adjustable differential.

A further object of the invention is the provision of a combustion controlling system in which the device which controls combustion is operated to decrease combustion when a temperature or pressure condition produced by combustion either rises above a predetermined maximum or falls below a predetermined minimum.

In addition, it is an object of this invention to provide means for intermittently increasing combustion sufficiently often to maintain a fire when the system is operating under low heat requirement conditions.

Specifically, it is an object of this invention to provide a system for the control of a solid fuel stoker mechanism, whereby the stoker will be stopped when the temperature of combustion becomes too high, will also be stopped when the temperature of combustion falls to a point indicating that the fire has gone out and wherein the stoker will be operated sufficiently often to normally maintain the fire alive when the system is operating under low heat requirement conditions. The invention also contemplates a system of the aforementioned type which includes a thermostat responsive to the temperature of the space to be heated and operative to start and stop the stoker in response to changes of such space temperatures.

Further objects of the invention will become apparent as the description thereof proceeds and for a more complete understanding of the invention, reference should be had to the following description and accompanying drawings in which.

Figure 1:
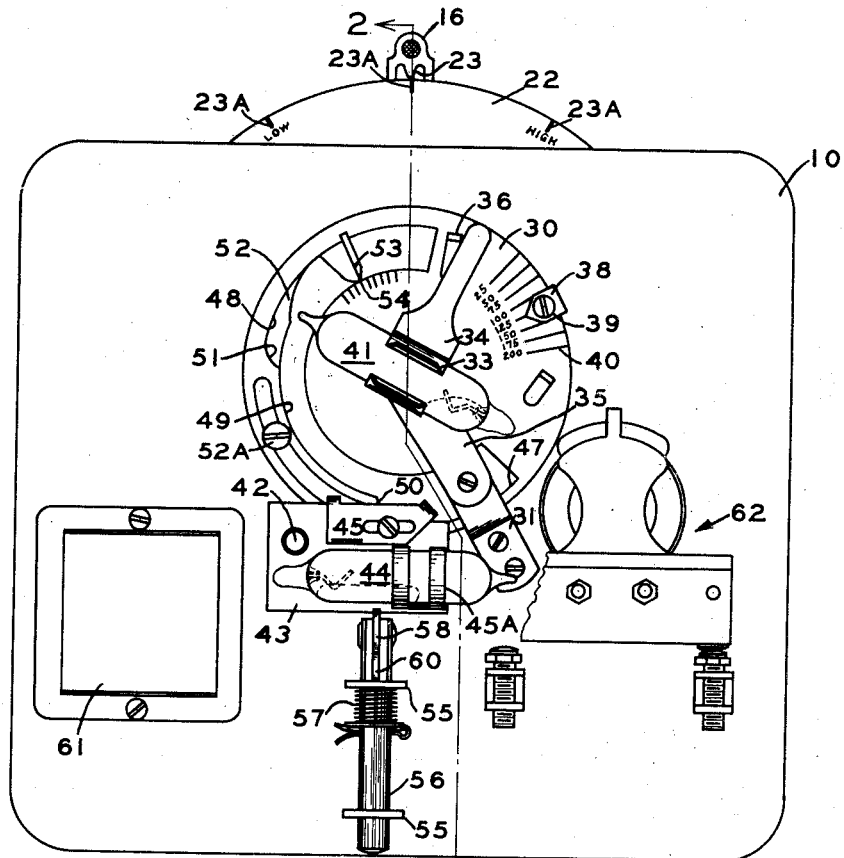
Fig. 1 is a front view of one form of the switching mechanism embodying the present invention.
Figure 2:
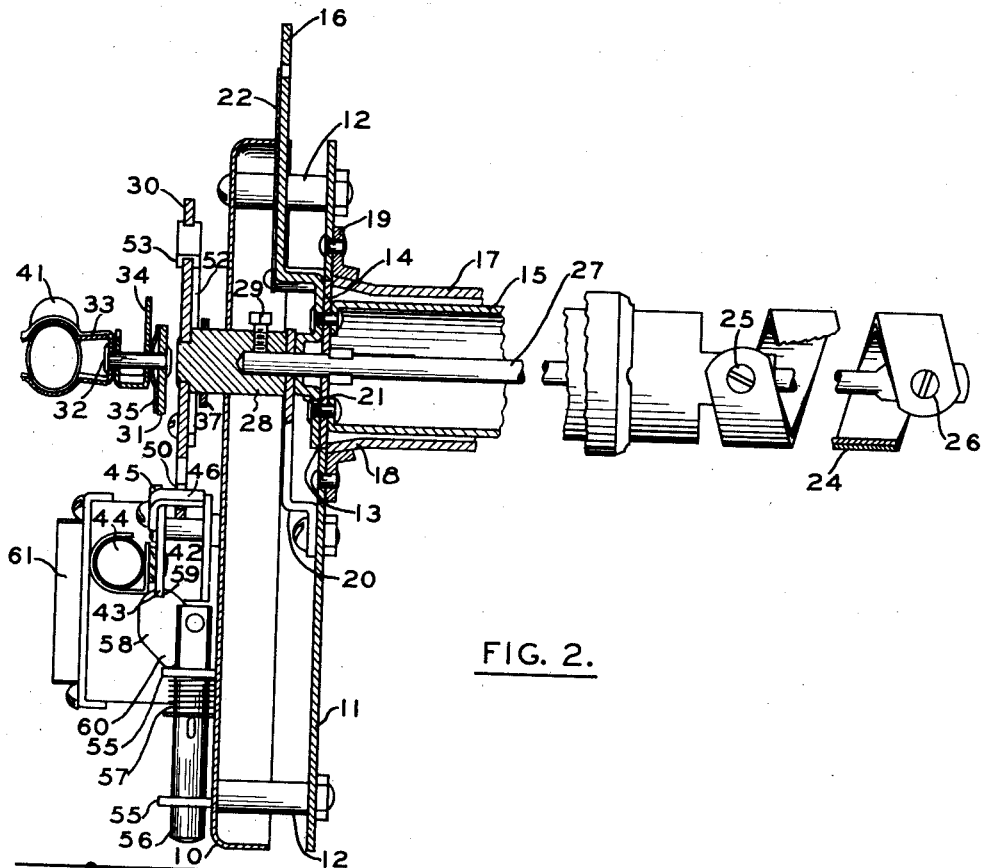
Fig. 2 is a sectional view taken about on line 2—2 of Fig. 1.

Referring first to Figs. 1 and 2 of the drawings, a base indicated at 10 supports a sub-base 11 by means of suitable connecting mechanism 12, which herein take the form of screws, nuts, and spacing sleeves. The sub-base 11 is provided with a circular opening 13 which receives a circular plate 14. A tubular member 15 is secured to one side of plate 14 and an adjusting handle 16 is secured to the other side thereof. A cylindrical member 17 surrounds tubular member 15 and one end of this cylindrical member 17 is slightly expanded as indicated at 18. The expanded end 18 of cylindrical member 17 covers the slight space between circular plate 14 and the periphery of the opening 13, abutting both the sub-base 11 and the circular plate 14 in such a manner that circular plate 14 may be rotated by adjusting handle 16 but is prevented from moving out of alignment with sub-base 11 in one direction. A collar 19 engages the expanded end 18 of cylindrical member 17 to hold the same in its proper position. A bracket 20, which is secured to sub-base 11, bears against a bulged portion 21 of adjusting handle 16 and prevents axial movement of circular plate 14 in a direction away from the end 18 of cylindrical member 17. In this manner, circular plate 14 may be rotated by adjusting handle 16 but cannot move out of alignment with the plate of sub-base 11 in either direction. A suitable scale plate 22 is secured to sub-base 11 by any usual means, extends above the top of base 10 and cooperates with a pointer 23 formed in adjusting handle 16. The scale plate 22 may be provided with suitable indicia as indicated at 23A.

One end of a helically coiled bi-metallic element 24 is secured to the free end of tubular member 15, as indicated at 25, and the other end thereof is secured, as indicated at 26, to a torsion rod 27 which extends through the bi-metallic coil 24, tubular member 15, circular plate 14 and associated parts, and terminates within the space between base 10 and sub-base 11. A collar 28 is secured to this end of torsion rod 27 by means of a set-screw 29 and extends through a suitable opening in base 10 and terminates in front of said base. Collar 28 carries a cam plate 30 which will be hereinafter described in more detail.

A switch supporting bracket 31 has one of its ends secured to the front of base 10 and its other end carries a pin 32, the axis of which is in alignment with the axis of torsion rod 27. A mercury switch clip 33 and an actuating arm 34 which are secured together are pivotally mounted upon pin 32. A leaf spring 35 has one of its ends secured to bracket 31 and presses against actuating arm 34, whereby the arm 34 and the mercury switch clip 33 are frictionally held against the enlarged head of the pin 32 in such a manner that the mercury switch clip 33 and the actuating arm 34 will be frictionally retained in any position to which they are moved. The cam 30 is provided with a struck-up portion 36 which operates as an actuating pin for the purpose of engaging actuating arm 34 upon movement of cam plate 30 in one direction. An arm 37, which is loosely journaled upon collar 28, is provided with a bent-over portion 38 which extends in front of cam plate 30 and receives a set-screw 39 for adjustably securing the arm 37 in any desired position. The cam plate 30 is preferably provided with suitable indicia 40, which cooperates with the pointed end of bent-over portion 38. The set-screw 39 acts as an actuating pin which engages the other side of actuating arm 34 upon movement of the cam plate 30 in the reverse direction to that resulting in engagement of arm 34 by pin 36. By loosening set-screw 39, and moving arm 37 in accordance with the indicia 40 on the cam plate 30, the amount of lost motion between actuating pins 36 and 39 may be adjusted as desired. A mercury switch 41 is carried by mercury switch clip 33.

The base 10 supports a pin 42 upon which is pivoted a U shaped plate 43 which in turn carries a second mercury switch 44 by means of a mercury switch clip 45A. The plate 43 likewise carries a horizontally adjustable plate 45 which is provided with a bent-over extension 46 that operates as a cam follower and normally bears against and engages an irregular cam surface formed in the cam plate 30. The cam plate 30 has cut-out portion leaving two circumferential cam surfaces 47 and 48 which are equally spaced from the center of cam plate 30 and a third circumferential cam surface 49 which is spaced a smaller distance from the center of cam plate 30. The cam surfaces 47 and 48 are joined to the cam surface 49 by means of cam surfaces 50 and 51 respectively. The cam plate 30 likewise carries an adjustable cam 52 which can be adjusted so that its cam surfaces coincide with the cam surfaces 49, 51 and 48 or so that the cam surface 49 is in effect, prolonged and the cam surface 48, in effect, is shortened. The cam 52 is provided with a pointer 53 which cooperates with suitable indicia 54 on the cam plate 30, whereby the proper adjustment of the cam 52 may be had, the cam 52 being secured in its adjusted position to cam 30 by any suitable means such as the screw 52A.

A pair of brackets 55 carried by base 10 journal a manually operable pin 56 which is biased to move downwardly by means of a light coiled spring 57. The upper end of pin 56 is slotted and receives a pivoted catch 58, having a notch 59 which is adapted to engage the lower edge of plate 43. The catch 58 is also provided with a tongue 60 which engages the upper surface of the upper bracket 55 when the notch 59 is engaged with plate 43. In this manner, the plate 43 may be latched in such a position that the mercury in mercury switch 44 bridges the electrodes of the mercury switch when the position of the cam surface 47 is such that the mercury switch 44 would otherwise be in open circuit position.

For certain purposes, the switching mechanism may be used to control low voltage circuits and a transformer 61 may be carried by base 10 if desired. Likewise, it may be found desirable to mount a relay generally indicated at 62 on base 10.

*Operation of the switching mechanism of Figs. 1 and 2*

In Figs. 1 and 2, the switching mechanism has been shown in its cold position with the mercury switch 44 closed and in such position that the same would be open if it were not for the fact that it is latched in closed position by the latch 58 above described. Assuming that the temperature to which bi-metallic thermostatic element 24 responds begins to rise, the cam 30 will be rotated in counterclock-wise direction as viewed in Fig. 1. After the cam plate 30 has been thus rotated in a counterclock-wise direction thorugh a relatively small arc, the cam surface 50 will engage cam follower 46 and begin to rotate plate 43 about pin 42 in a counterclock-wise direction. Upon further rotation of cam plate 30 in the same direction, the cam follower 46 rides upon cam surface 49 with the result that plate 43 is elevated to such a position that the notch 59 of catch 58 is disengaged. Spring 57 thereupon moves pin 56 downward and the switching mechanism is thereupon subjected to automatic control. If the temperature should now fall, the cam plate 30 will rotate in a clock-wise direction and cam follower 46 will ride down cam surface 50 and on to cam surface 47, thereby allowing plate 43 to move in a clock-wise direction about pin 42, with the result that mercury switch 44 will move to open circuit position. The plate 43 can thereupon be again manually latched in the position shown in the drawings by means of the latch 58.

Assuming however, that the temperature continues to rise, the set-screw or actuating pin 39 will engage arm 34 and rotate mercury switch 41 in a clock-wise direction until the same has been moved to open circuit position. If the temperature rises still further, the cam follower 46 will ride down the cam surface of cam 52 and again allow plate 43 to move to such a position that mercury switch 44 will be opened. Assuming that the temperature now falls, the cam follower 46 will ride up the cam surface of cam 52, tilting plate 43 and reclosing mercury switch 44. If the temperature continues to fall, the actuating pin 36 will engage the opposite side of actuating arm 34 and move mercury switch 41 to closed position. It will be noted that the mercury switch 41 is moved to closed circuit position by actuating pin 36 at a lower temperature than that at which it was moved to open circuit position by set-screw 39. This differential may be varied or entirely eliminated by proper adjustment of the arm 37 and set-screw or actuating pin 39. If the temperature continues to fall, cam follower 46 will ride down cam surface 50 on to cam surface 47, whereupon mercury switch 44 will be moved to open position where it will remain unless the temperature again rises or unless the mercury switch 44 is relatched in closed position as shown in the drawings.

Moving of adjusting handle 16 rotates circular plate 14 and tubular member 15 with the result that the thermostatic element 24 is bodily rotated. Such operation of adjusting handle 16 positions cam plate 30 in a new position for any given temperature to which thermostatic element 24 responds. This adjustment will be referred to as a basic adjustment since it varies the temperature at which both mercury switches 41 and 44 will be operated. In addition, the position of cam follower 46 may be varied, whereby the on and off movements of mercury switch 44 at both the high and low temperatures may be changed within reasonable limits. Likewise, the cam 52 may be adjusted so as to prolong or shorten the cam surface 49 with the result that the high temperature at which mercury switch 44 will be opened and closed may be additionally varied.

The switching mechanism of Figs. 1 and 2 therefore provides a first switch 44 which is in open position when the temperature is high, which is in closed position when the temperature is intermediate and which is in open position when the temperature is low. The various temperatures at which this switch 44 is operated may be adjusted and in each instance, the various adjustments are interposed upon other basic adjustments. Likewise, the switch 44 may be latched in closed position when it would normally be open because of a low temperature at the thermostatic element 24, the arrangement being such that the mercury switch 44 returns to automatic control upon a rise in temperature sufficiently great to move the mercury switch 44 to closed position, if it had not already been latched in such position.

The switching mechanism in Figs. 1 and 2 includes a second switch 41 which may be operated either with or without an adjustable differential and is moved from open to closed position and back again by reason of temperature fluctuations which are not great enough to move switch 44 from its closed position. It will therefore be seen that the operation of switch 41 has a definite relationship to the operation of switch 44.

Figure 3:
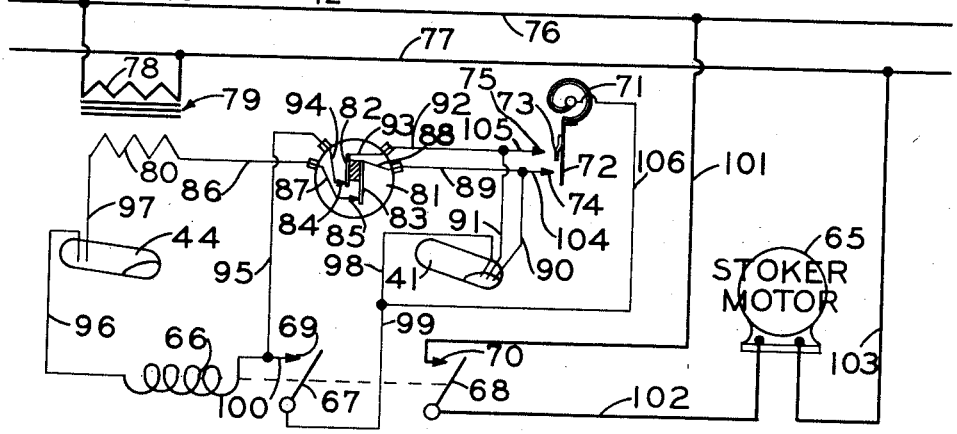
Fig. 3 is a schematic wiring diagram showing the heat control system which is the subject matter of the present invention.

Turning now to Fig. 3 of the drawings, an electrically operable device herein referred to as a stoker motor is indicated at 65. The coil 66 of relay 62 is adapted to move switch arms 67 and 68 into engagement with contacts 69 and 70 when energized, the switch arms 67 and 68 being biased to open position. A main control switch in the form of a bi-metallic room thermostat is indicated at 71 and includes contact blades 72 and 73 which are sequentially engageable with contacts 74 and 75 upon temperature fall. Line voltage wires 76 and 77 supply electric energy to stoker motor 65 and likewise to the primary 78 of a step-down transformer 79, having a low voltage secondary 80. The system may also include a usual limit control to prevent an excessive temperature or pressure condition in the furnace or boiler, if desired. A limit control 81 is herein shown as comprising a pair of contact blades 82 and 83 which sequentially disengage contacts 84 and 85 when the temperature or pressure of the boiler becomes too high. Contact blades 82 and 83 are insulated from each other. Such limit controls are well known in the art and a more specific description thereof is therefore deemed unnecessary. The specific connections between the various switches and devices shown in Fig. 3 will be described under operation.

*Operation of the system of Fig. 3*

With the parts in the position shown in Fig. 3, the stoker motor 65 is not operating. The room thermostat 71 is in open circuit position, indicating that the temperature of the space is above the desired value. The limit control 81 is in closed circuit position, indicating that the furnace or boiler is cold. The mercury switch 44 (hereinafter referred to as a "combination high limit and out-fire switch") is in open circuit position. The mercury switch 41 (hereinafter referred to as the "hold-fire switch") is in the closed circuit position. The position of switches 44 and 41 indicates that their actuator is in its cold position. The switch 41 is unable to actuate relay coil 66 and operates stoker motor 65 because switch 44 is in the open circuit position.

If it now be desired to start up the fire and put the system into condition for automatic operation, the combination high limit and out-fire switch 44 should be latched in closed circuit position in the manner previously described, in connection with Fig. 1 and Fig. 2. Such closure of the combination high limit and out-fire switch 44 establishes an energizing circuit for relay coil 66 through hold-fire switch 41 as follows: secondary 80, wire 86, wire 87, contact 85, contact blade 83, wire 88, wire 89, wire 90, hold-fire switch 41, wire 91, wire 92, wire 93, switch blade 82, contact 84, wire 94, wire 95, relay coil 66, wire 96, combination high limit and out-fire switch 44 and wire 97 to secondary 80. Energization of relay coil 66 attracts switch arms 67 and 68 and moves them into engagement with contacts 69 and 70 respectively.

Engagement of switch arm 67 with contact 69 establishes a holding circuit for relay coil 66 independent of contact 84 and contact blade 82 which holding circuit is as follows: secondary 80, wire 86, wire 87, contact 85, contact blade 83, wire 88, wire 89, wire 90, hold-fire switch 41, wire 98, wire 99, switch arm 67, contact 69, wire 100, relay coil 66, wire 96, combination high limit and out-fire switch 44, and wire 97 to secondary 80. Engagement of switch arm 68 with contact 70 energizes stoker motor 65 as follows: line 76, wire 101, contact 70, switch arm 68, wire 102, stoker motor 65, and wire 103 to line 77.

The stoker motor is now operating and if the fire is rekindled manually, the fire will begin to build up. The thermostatic element 24 of switching mechanism of Figs. 1 and 2 preferably responds to the temperature of combustion and is preferably placed in the stack of the furnace or boiler. The increase in combustion temperature, due to the re-establishment of combustion, first operates to release the latching mechanism which returns the combination high limit and out-fire switch 44 to automatic control. This increase in temperature, as previously explained in connection with Figs. 1 and 2, is sufficient that combination high limit and out-fire switch 44 is automatically maintained in closed circuit position.

As the stoker continues to operate, the temperature of combustion will rise sufficiently to move hold-fire switch 41 to open circuit position, whereupon relay coil 66 will be de-energized, allowing switch arms 67 and 68 to move to the positions shown in Fig. 3, resulting in the de-energization of stoker motor 65. The temperature of combustion will now begin to fall and when it has lowered sufficiently, the hold-fire switch 41 will again be moved to closed circuit position, whereupon the stoker will be again put into operation to feed fuel to the fire. Normally, the fire will still be in such condition that the new fuel fed thereto will become ignited and in this manner the fire-bed will be kept alive by the operation of hold-fire switch 41. If, for any reason, the fire should go out, the temperature of combustion will fall to such a point that combination high limit and out-fire switch 44 will move to open circuit position, whereupon the system will again be rendered inoperative until the fire is rekindled and combination high limit and out-fire switch 44 is again manually latched in closed circuit position.

Assuming that the fire is properly maintained by the operation of hold-fire switch 41, the temperature of the space to be heated will finally fall below the point desired, resulting in engagement of contact arm 72 with contact 74 and then contact arm 73 with contact 75. If the stoker is not already in operation at this time, it will be thereupon placed in operation through energization of relay coil 66 by an energizing circuit which is as follows: secondary 80, wire 86, wire 87, contact 85, contact blade 83, wire 88, wire 89, wire 104, contact 74, contact blades 72 and 73, contact 75, wire 105, wire 92, wire 93, contact blade 82, contact 84, wire 94, wire 95, relay coil 66, wire 96, combination high limit and out-fire switch 44 and wire 97 to secondary 80.

Energization of relay coil 66 will attract switch arms 67 and 68 as hereinbefore described, resulting in the establishment of the aforementioned energizing circuit for stoker motor 65 and the establishment of a holding circuit for relay coil 66 which is independent of contacts 75 and 84 and contact blades 73 and 82. This holding circuit is as follows: Secondary 80, wire 86, wire 87, contact 85, contact blade 83, wire 88, wire 89, wire 104, contact 74, contact blade 72, wire 106, wire 99, switch arm 67, contact 69, wire 100, relay coil 66, wire 96, combination high limit and out-fire switch 44 and wire 97 to secondary 80.

If the stoker 65 were already in operation by reason of closure of hold-fire switch 41, then the last described holding circuit would become established upon engagement of contact blade 72 with contact 74 with the result that stoker operation would be maintained upon opening of hold-fire switch 41 as long as contact blade 72 remained in engagement with contact 74.

If the temperature of combustion should become higher than desired as determined by the adjustment of the switching mechanism of Figs. 1 and 2, combination high limit and out-fire switch 44 will be moved to open circuit position, resulting in de-energization of relay coil 66 and stoker motor 65. If the stoker motor 65 is de-energized in this manner, the temperature of combustion will fall until combination high limit and out-fire switch 44 is automatically reclosed, whereupon relay coil 66 will again be energized and stoker motor 65 put into operation.

Likewise, if the room thermostat continues to call for heat and the temperature of combustion does not become excessive, but the temperature or pressure of the boiler becomes excessive, resulting in disengagement of contact blade 82 from contact 84 and then contact blade 83 from contact 85, energization of relay coil 66 will be interrupted, resulting in stopping of the stoker motor 65. When the boiler pressure or temperature has thereafter lowered sufficiently to cause re-engagement of contact blades 83 and 82 with contacts 85 and 84 and if the room thermostat 71 is still calling for heat, the relay coil 66 will again be energized in the manner above described to again place the stoker motor 65 into operation. When the room temperature is restored so as to separate contact blade 73 from contact 75 and then separate contact blade 72 from contact 74, relay coil 66 will be de-energized and the stoker motor 65 placed out of operation.

From the foregoing discussion of Fig. 3, it will be apparent that the system disclosed therein provides for operation of the stoker motor 65 sufficiently often by the hold-fire switch 41 to keep the fire alive under normal conditions of operation. In addition, the stoker motor 65 may be operated whenever the room temperature drops below the desired point, since the room thermostat 71 and the hold-fire switch 41 are connected to the relay coil 66 in parallel. Furthermore, if the temperature of combustion becomes too high, the stoker motor 65 will be stopped by the combination high limit and out-fire switch 44 until such temperature falls to a safe amount. It should be noted that the combination high limit and out-fire switch 44 serves a dual purpose for it will also stop the stoker motor 65 when the temperature of combustion falls to a point as to indicate that the fire has become extinguished or is not likely to pick up if further fuel is fed to it. It should also be noted that the combination high limit and out-fire switch 44 and the hold-fire switch 41 are operated by a single thermostatic element. It should also be noted that if the fire should become extinguished, the system will be rendered inoperative until manual attention is given and that provision is made whereby the stoker may be manually put into operation with a subsequent return to automatic control.

Figure 5:
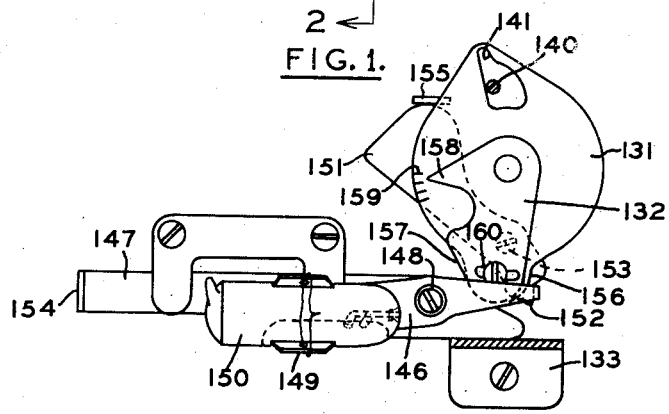
Figure 4:
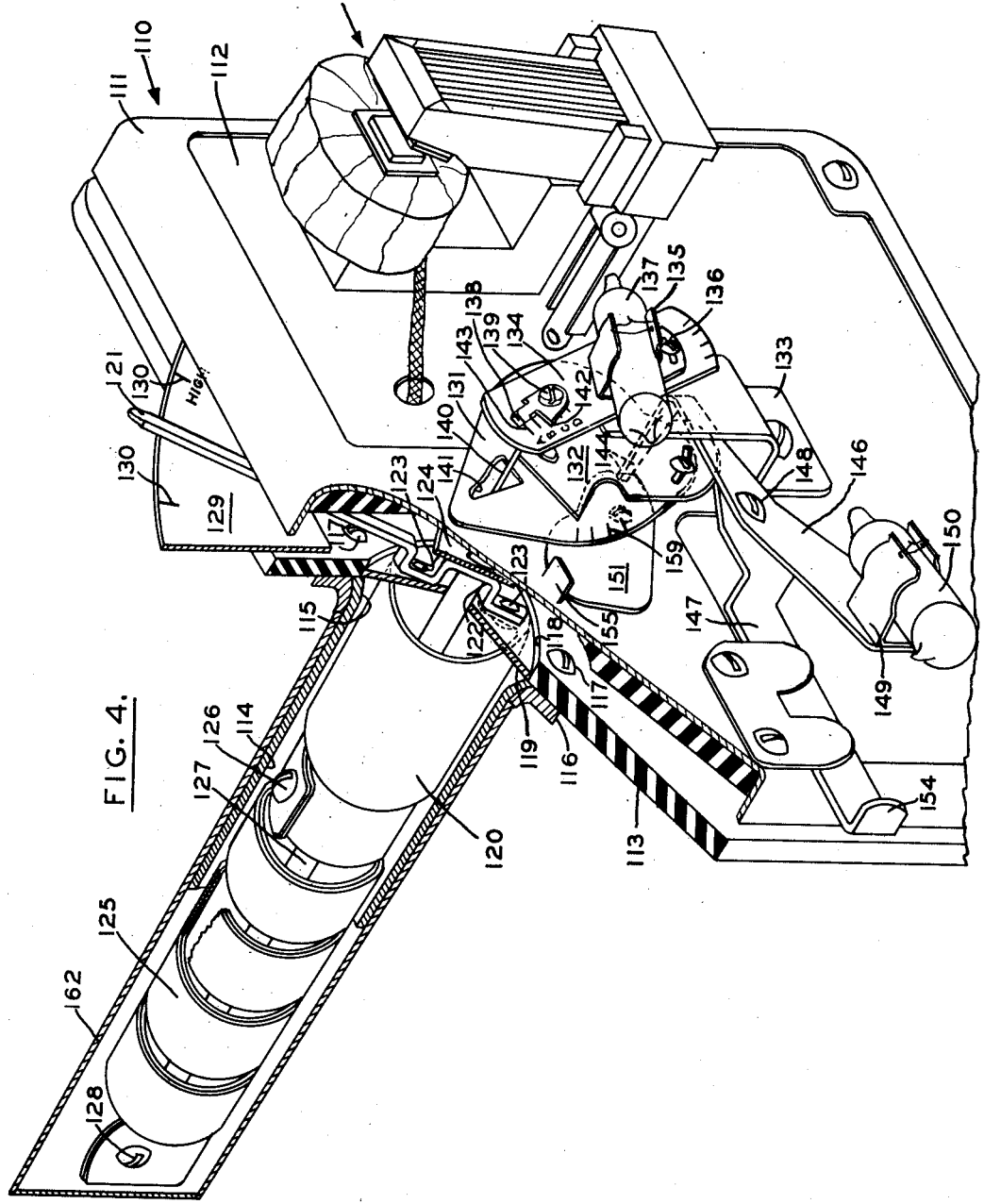
Fig. 4 is a perspective view of a modified form of the switching mechanism shown in Figs. 1 and 2; and, Fig. 5 is a detail of a part of the mechanism of Fig. 4.

Turning now to Figs. 4 and 5, a modified switching mechanism is shown which may be utilized in the system of Fig. 3 in place of the switching mechanism shown in Figs. 1 and 2. A base generally indicated at 110 comprises a flanged metallic member 111 and a panel 112 of insulating material, part of metallic member 111 being cut away in order to allow the securing of certain electrical parts directly to the insulating panel 112. A sub-base of heat insulating material is indicated at 113 and is held in spaced relation in respect to base 110 by any suitable means not shown. A tubular member 114 has one of its ends expanded as indicated at 115 and this expanded end 115 is held in abutting relation with the sub-base 113 by means of a collar 116 which is secured to sub-base 113 by screws 117. The sub-base 113 is provided with a circular opening 118 in which a plate 119 is disposed. A tubular member 120 which is concentric with and disposed within tubular member 114 has one of its ends secured to one side of plate 119. To the other side of plate 119 is secured an adjusting and indicating handle 121 which is provided with a raised portion 122. The tubular member 120 and adjusting handle 121 are suitably secured to plate 119 by means of rivets 123. The plate 119 is allowed to rotate but is prevented from moving axially in one direction by abutting with the expanded end 115 of tubular member 114 and in the other direction by a retainer 124 which abuts the raised portion 122 of adjusting and indicating handle 121. A bi-metallic thermostatic element 125 has one of its ends secured to the free end of tubular member 120, as indicated at 126, and the other end of bi-metallic thermostatic element 125 is secured to one end of a torsion rod 127 as indicated at 128. The torsion rod 127 extends axially through bi-metallic thermostatic element 125, tubular member 120, plate 119, up-raised portion 122 of handle 121, retainer 124 and base 110.

Adjusting and indicating handle 121 cooperates with a scale plate 129 having suitable indicia 130 thereon. Movement of adjusting and indicating handle 121 across scale plate 129 rotates tubular member 120 and thereby bodily positions the thermostatic element 125 whereby that end thereof which is secured to torsion rod 127 may be manually made to assume varying positions while the temperature to which thermostatic element 125 responds, remains constant.

The torsion rod 127 terminates shortly in front of base 110 and securely carries an actuating plate 131. An adjustable cam plate 132 is pivoted on actuating plate 131 at a point which is in alignment with the axis of rotation of actuating plate 131 and torsion rod 127. A bracket 133 is secured to insulating panel 112 and pivotally carries a switch operating member 134. An adjustable mercury switch clip 135 is pivoted to switch operating member 134 and is adjustably secured in the desired position by a screw 136. The mercury switch clip 135 supports a mercury switch 137 which corresponds to the combination high limit and hold-fire switch 41 of the mechanism of Figs. 1 and 2 as will hereinafter appear. The axes of rotation of mercury switch clip 135 and switch operating member 134 are in alignment with the axes of rotation of torsion rod 127 and actuating plate 131. Switch operating member 134 is provided with a slot 138 which permits bodily adjustment of a screw 139 having an extended end 140 which extends into an irregularly shaped opening 141 formed in actuating plate 131. An indicator 142 is clamped against switch operating member 134 by screw 139 and cooperates with indicia 143 to indicate the adjusted position of the extended end 140 of screw 139.

The mechanism of Figs. 4 and 5 thus far described operates as follows: Upon a rise in the temperature to which bi-metallic element 125 responds, the torsion rod 127 and actuating plate 131 are rotated in a counter clock-wise direction as viewed from the front in Fig. 4 and after a certain amount of lost motion is taken up, the right hand edge formed by the opening 141 in the actuating plate 131 engages the extended end 140 of screw 139 and tilts switch operating member 134 and mercury switch 137 in counter clock-wise direction to open the circuit through mercury switch 137. Likewise, upon temperature fall, after the lost motion has been taken up, the left hand edge formed by the opening 141 in actuating plate 131 will engage the extended end 140 of screw 139 and tilt switch operating member 134 and mercury switch 137 in a clock-wise direction to close the circuit through mercury switch 137. Bodily adjustment of screw 139 changes the location of extended end 140 thereof in respect to the opening 141 formed in actuating plate 131, whereby to vary the amount of lost motion between actuating plate 131 and the extended end 140 of screw 139 from a maximum to a minimum with the result that the temperature differential required to operate mercury switch 137 may be adjustably predetermined. The irregular configuration of the opening 141 in actuating plate 131 is provided in order that equal bodily movements of screw 139 in accordance with the indicia 143 will result in equal changes in the operating differential for mercury switch 137. Operation of adjusting and indicating handle 121 bodily moves the thermostatic element 125 and changes the basic setting at which mercury switch 137 will be operated. The mercury switch 137 may also be manually adjusted to a certain extent by loosening screw 136 and rotating mercury switch clip 135. This adjustment is quite important in relation to the other functions of the switching mechanism of Figs. 4 and 5 as will hereinafter become apparent.

The lower periphery of actuating plate 131 and the lower periphery of cam plate 132 cooperate to form a cam surface which is engaged by a cam follower 144 which is formed by bending over one end of a lever 146 which is pivoted to a slideable mounting 147 as indicated at 148. The other, or left hand end of lever 146 supports a mercury switch clip 149 which carries a mercury switch 150. The mercury switch 150 corresponds to the combination high limit and out-fire switch 44 of the mechanism of Figs. 1 and 2. With the parts in the position shown, the cam follower 144 is out of engagement with actuating plate 131 and cam plate 132 and is held in such position by a latch plate 151 which is formed with a hook 152. The circuit through mercury switch 150 is closed. If the lever 146 is rotated slightly in clock-wise direction about its pivot 148, the cam follower 144 will disengage the hook 152 and allow latch plate 151 to rotate about its pivot 153 in a counter clock-wise direction. If lever 146 is now released, it will rotate in counter clock-wise direction about its pivot 148 by gravity, and the cam follower 144 will engage the periphery of actuating plate 131 whereupon the lever 146 will assume such position that the circuit through mercury switch 150 is broken.

In order to relatch mercury switch 150 in closed circuit position, the slideable mounting 147 is moved to the right by grasping the operating handle 154 and the cam follower 144 will engage and ride under hook 152. Subsequent movement of slidable mounting 147 to the left will thereupon cause the parts to assume the position shown in Figs. 4 and 5 wherein the cam follower 144 is engaged with hook 152 and the mercury switch 150 is latched in closed circuit position. Excessive clock-wise rotation of latch plate 151 is prevented by a lug 155 which is struck-up from the metallic member 111 of base 110.

If the temperature to which thermostatic element 125 responds should rise, actuating plate 131 and cam plate 132 will be rotated in a counter clock-wise direction and the projected portion 156 of actuating plate 131 will engage cam follower 144 and slightly depress the right hand end of lever 146. Such depression of the right hand end of lever 146 will disengage cam follower 144 from hook 152 and latch plate 151 will rotate in a counter clock-wise direction to its inoperative position. Upon further counter clock-wise movement of actuating plate 131, extension 140 of screw 139 will be engaged as hereinbefore described with the result that mercury switch 137 will be moved to open circuit position. Further counter clock-wise rotation of actuating plate 131 will allow cam follower 144 to ride down the edge 157 of cam plate 132 until the lever 146 rotates sufficiently in a counter clock-wise direction to open the circuit through mercury switch 150. This is the high limit cut-off position of mercury switch 150. If the temperature to which thermostatic element 125 responds should now decrease as previously explained in connection with the system of Fig. 3, the cam plate 132 and actuating plate 131 will be moved in a clock-wise direction. Such motion will depress cam follower 144 to again move mercury switch 150 to closed circuit position. Continued movement of actuating plate 131 in a clock-wise direction in response to a further temperature fall will cause the extended end 140 of screw 139 to be engaged with the result that mercury switch 137 is moved to closed position as previously explained. Further continued rotation of actuating plate 131 and cam plate 132 in a clock-wise direction will allow the cam follower 144 to ride off the projected portion 156 of actuating plate 131, whereupon mercury switch 150 will move to open circuit position. This is the lock-out position corresponding to the lock-out position of switch 44 of the mechanism of Figs. 1 and 2 as explained in connection with the system of Fig. 3. As previously explained, mercury switch 150 will remain in this open circuit position until latched in closed circuit position by proper manipulation of the slidable mounting 147.

The cam plate 132 is provided with a pointer 158 which cooperates with indicia 159 which is provided on actuating plate 131. A screw 160 permits of adjustment of cam plate 132 and such adjustment of cam plate 132 acts to extend or contract the cam surface formed in actuating plate 131, which cam surface controls the operation of mercury switch 150 by means of cam follower 144.

The operation of the switching mechanism of Figs. 4 and 5 is identical with that of Figs. 1 and 2. The adjusting and indicating handle 121 provides for a basic adjustment, whereby both mercury switches 137 and 150 may be adjusted in unison. Bodily movement of screw 139 provides for a variable differential in the operation of mercury switch 137. Adjustment of mercury switch clip 135 provides an additional adjustment for mercury switch 137 which adjustment may be superimposed upon the basic adjustment. Adjustment of cam plate 132 likewise provides another adjustment for mercury switch 150 which is superimposed upon the basic adjustment. The mercury switch 150 is a three-position switch which is operated from open to closed and then again to open circuit position upon temperature fall and may be manually latched in closed circuit position when the temperature is so low that it would otherwise be in open circuit position. The mercury switch 137 is moved to closed and open circuit positions and vice versa while the mercury switch 150 is maintained in closed circuit position during normal temperature variations. In actual construction, a relay, generally indicated at 161, may be mounted upon insulating panel 112 of base 110. Also, it may be desirable to place a protecting tube 162 about thermostatic element 125. In addition, it may be desirable to mount a transformer on insulating panel 112.

From the foregoing description it will therefore be seen that this invention provides two modifications of a novel switching mechanism, having the many features pointed out in the introduction and throughout the specification. The invention also provides a novel system of control wherein a burner apparatus is automatically operated sufficiently often to maintain the fire, may be operated as required by changes in the temperature of the space to be heated, is temporarily shut down if the temperature of the combustion gases or the temperature of the boiler or furnace become excessive and is permanently shut down if the temperature of combustion falls to a point indicating that the fire has become extinguished. The system is also so arranged that the burner apparatus may be manually operated when the fire has become extinguished and will return to automatic control as soon as the temperature of combustion rises to a point indicating that the fire again is capable of automatic control.

While specific embodiments of the switching mechanism have been herein described and a single embodiment of the system has been disclosed, it is to be understood that many changes and modifications thereof could be made without departing from my invention and I intend to be limited only by the scope of the appended claims.

I claim:

1. A device of the class described, comprising, in combination, an actuator, a member controlled thereby, means associated with the actuator for causing said controlled member to assume a first position, then a second position, and thereafter again assume the first position upon movement of the actuator in a single direction, means for basically adjusting said first named means whereby the positions of the actuator at which said first and second positions are assumed by the control member may be changed in unison, and means associated with said first and second named means whereby the position of the actuator at which said controlled member will assume one of said positions may be varied in respect to another of said positions.

2. A device of the class described, comprising, in combination, an actuator responsive to a physical condition, a switch controlled thereby, means associated with said switch and actuator whereby the former assumes open circuit position, then closed circuit position and thereafter open circuit position upon movement of the actuator in a single direction, and means for manually latching said switch in closed circuit position when said actuator is in one of its positions resulting in movement of the switch to open circuit position, said means being operable upon return of said actuator to a position normally causing said switch to assume closed circuit position, to return said switch to the automatic control of said actuator.

3. A switching mechanism of the class described, comprising, in combination, a first switch, a second switch, an actuator, and means associated with said actuator and first and second switches for causing said first switch to assume a first circuit controlling position when the actuator is in one position, to cause said first switch to assume a second circuit controlling position upon movement of the actuator in one direction, to cause said second switch to assume a new circuit controlling position upon further movement of the actuator in the same direction and to cause the first switch to assume its first circuit controlling position upon still further movement of the actuator in the same direction.

4. In combination, a thermostatic element, a switch, means associated with said thermostatic element and switch for operating the latter upon variations in the temperature to which the former responds, said means being operative to cause said switch to assume a first circuit controlling position when the temperature at the thermostatic element is relatively high, assume a second circuit controlling position upon a first lowering in said temperature and reassume its first circuit controlling position upon still further lowering in said temperature, and means for manually latching said switch in its second circuit controlling position when said temperature becomes so low as to cause said switch to move to its first circuit controlling position, said last named means being operative to release said switch for automatic operation by said thermostatic element upon a raising in the temperature to which it responds.

5. In combination, a thermostatic element, a switch, means associated with said thermostatic element and switch for operating the latter upon variations in the temperature to which the former responds, said means being operative to cause said switch to assume a first circuit controlling position when the temperature at the thermostatic element is relatively high, assume a second circuit controlling position upon a first lowering in said temperature and reassume its first circuit controlling position upon still further lowering in said temperature, and means for manually latching said switch in its second circuit controlling position when said temperature becomes so low as to cause said switch to move to its first circuit controlling position, said last named means being operative to release said switch for automatic operation by said thermostatic element upon a raising in the temperature to which it responds, a second switch, and means associated with the second switch and thermostatic element for moving the second switch to open and closed positions while the first switch is maintained in its second circuit controlling position.

6. In combination, an actuator responsive to changes in a physical condition, a switch, connections between said switch and actuator operative to move said switch from a first controlling position to a second controlling position and to return the same to said first controlling position upon progressive movement of said actuator in a single direction, a second switch, and connections between said actuator and second switch operative to move said second switch to first and second controlling positions upon reverse movements of said actuator while said first switch is maintained in its second controlling position by said actuator.

7. In combination, an actuator responsive to variations in a physical condition, a first switch, connections between said first switch and actuator by which the actuator moves the first switch to open and closed positions upon relatively small reverse movements thereof, a second switch, and connections between said second switch and actuator by which the actuator maintains said second switch closed while the actuator moves reversely through said relatively small movement and opens said second switch upon sufficient further movement of said actuator in either direction.

8. In combination, an actuator responsive to temperature changes, a first switch, connections between said actuator and first switch operative to close the first switch when the temperature to which said actuator responds falls to a first value and to open the first switch when the temperature to which the actuator responds rises to a second value, a second switch, and connections between the second switch and actuator by which the actuator maintains the second switch closed during such temperature fluctuations and opens the same upon a fall or rise of the temperature to which said actuator responds below said first value or above said second value.

9. In combination, an actuator responsive to temperature changes, a first switch, connections between said actuator and first switch operative to close the first switch when the temperature to which said actuator responds falls to a first value and to open the first switch when the temperature to which the actuator responds rises to a second value, a second switch, connections between the second switch and actuator by which the actuator maintains the second switch closed during such temperature fluctuations and opens the same upon a fall or rise of the temperature to which said actuator responds below said first value or above said second value, and means including a manually operable latch to latch said second switch in closed position when the temperature to which said actuator responds falls below said first value thereby causing opening of said second switch, said means operating to restore said second switch to automatic control upon a subsequent sufficient rise in temperature to normally cause said second switch to close.

10. A device of the class described, comprising, in combination, a temperature responsive actuator, a switch controlled thereby, means associated with said actuator for moving said switch from open position to closed position and then back to open position upon continuous movement of said actuator in a single direction, means operable to basically adjust the temperature at which all of said switch movements will occur, and additional adjusting means operable to vary the range of temperature change required to cause all of said switch movements.

11. A device of the class described, comprising, in combination, a temperature responsive actuator, a switch controlled thereby, means associated with said actuator for moving said switch from open position to closed position and then back to open position upon continuous movement of said actuator in a single direction, means operable to basically adjust the temperature at which all of said switch movements will occur and additional adjusting means operable to individually adjust the points at which said switch will be moved to open circuit position.

12. A switching mechanism of the class described, comprising, in combination, an actuator, a first switch, connections between said first switch and actuator by which said actuator moves said first switch from a first circuit controlling position to a second circuit controlling position and back to said first circuit controlling position upon movement of said actuator in a single direction, a second switch, connections between said actuator and second switch by which the actuator moves said second switch to first and second circuit controlling positions upon reverse movements of the actuator while maintaining the first switch in its second circuit controlling position, basic adjustment means associated with said actuator and both said switches operative to simultaneously adjust the operation of both of said switches, and additional adjusting means associated with one of said switches operative to additionally adjust the same without disturbing the adjustment of the other of said switches.

13. A switching mechanism of the class described, comprising, in combination, an actuator, a first switch, connections between said first switch and actuator by which said actuator moves said first switch from a first circuit controlling position to a second circuit controlling position and back to said first circuit controlling position upon movement of said actuator in a single direction, a second switch, connections between said actuator and second switch by which the actuator moves said second switch to first and second circuit controlling positions upon reverse movements of the actuator while maintaining the first switch in its second circuit controlling position, basic adjustment means associated with said actuator and both said switches operative to simultaneusly adjust the operation of both of said switches, and additional adjusting means comprising an adjustable lost-motion connection associated with one of said switches.

14. A switching mechanism of the class described, comprising, in combination, an actuator, a first switch, connections between said first switch and actuator by which said actuator moves said first switch from a first circuit controlling position to a second circuit controlling position and back to said first circuit controlling position upon movement of said actuator in a single direction, a second switch, connections between said actuator and second switch by which the actuator moves said second switch to first and second circuit controlling positions upon reverse movements of the actuator while maintaining the first switch in its second circuit controlling position, basic adjustment means associated with said actuator and both said switches operative to simultaneously adjust the operation of both of said switches, and additional adjusting means comprising an adjustable lost-motion connection associated with said second switch.

15. A switching mechanism of the class described, comprising, in combination, an actuator, a first switch, connections between said first switch and actuator by which said actuator moves said first switch from a first circuit controlling position to a second circuit controlling position and back to said first circuit controlling position upon movement of said actuator in a single direction, a second switch, connections between said actuator and second switch by which the actuator moves said second switch to first and second circuit controlling positions upon reverse movements of the actuator while maintaining the first switch in its second circuit controlling position, basic adjustment means associated with said actuator and both said switches operative to simultaneously adjust the operation of both of said switches, and additional adjusting means operative to change the range of movement required of said actuator to move said first switch through all of its switching movements.

16. A switching mechanism of the class described, comprising, in combination, an actuator, a first switch, connections between said first switch and actuator by which said actuator moves said first switch from a first circuit controlling position to a second circuit controlling position and back to said first circuit controlling position upon movement of said actuator in a single direction, a second switch, connections between said actuator and second switch by which the actuator moves said second switch to first and second circuit controlling positions upon reverse movements of the actuator while maintaining the first switch in its second circuit controlling position, basic adjustment means associated with said actuator and both said switches operative to simultaneously adjust the operation of both of said switches, and additional adjusting means operative to change one of the positions of the actuator at which said first switch is moved to its first circuit controlling position.

17. In combination, an actuator responsive to changes in a physical condition, a switch controlled thereby, means associated with said actuator for moving said switch from one controlling position to a second controlling position and to return the same to said first controlling position upon progressive movement of said actuator in a single direction, means operable to basically adjust the value of the condition at which all of said switch movements will occur, and additional adjustment means operable to independently vary the value of the condition at which said switch returns from said second position to said first position upon movement of said actuator in said single direction.

CLIFFORD HOTCHKISS.